Feb. 8, 1944.                    C. D. WATSON                    2,341,003
                        END FITTING FOR FLEXIBLE HOSES
                             Filed June 21, 1941

Inventor
Cyril Daniel Watson
By Martin J. Finnegan
Attorney

Patented Feb. 8, 1944

2,341,003

UNITED STATES PATENT OFFICE 2,341,003

END FITTING FOR FLEXIBLE HOSES

Cyril Daniel Watson, Leamington Spa, England, assignor to Automotive Products Company Limited, Leamington Spa, England Application June 21, 1941, Serial No. 399,190
In Great Britain July 18, 1940

1 Claim. (Cl. 285—84)

This invention relates to end fittings for flexible hoses, and more particularly for hoses such as are used in liquid pressure braking and remote control systems, which are required to stand high pressures.

Such fittings commonly comprise a portion projecting beyond the end of the hose itself for engagement with and attachment to an appropriate fitting, a nipple passing into the bore of the hose, and a sleeve surrounding the end of the hose, the hose being gripped between the nipple and sleeve to hold the end fitting thereon.

The principal objects of the invention are to provide an end fitting which is simple to manufacture, and which substantially prevents fluid passing through the hose from coming into contact with the end surface of the hose.

According to the invention, a hose end fitting to which the hose is secured by radially inward compression of an outer sleeve to grip the hose between the said sleeve and a nipple located in the bore, is characterised by the feature that the main part of the end fitting comprises the projecting portion and the nipple integral therewith or permanently secured thereto, and the outer sleeve, which is separate from the main part is secured thereto by radial compression into a circumferential groove in the main part, the radial compression of the sleeve for both purposes being effected in a single operation by forcing it axially into a suitably dimensioned surrounding member.

The outer sleeve may be circumferentially continuous and formed with externally thickened portions extending circumferentially around it, one of said thickened portions being at one end and the other intermediate the ends, and the end fitting being assembled on the hose and the sleeve passed through a swaging die, to compress the thickened portions inwardly, one to grip the hose and the other to enter the circumferential groove in the main part of the end fitting and secure the sleeve thereto. Alternatively, the sleeve may be split longitudinally and formed with an inwardly directed flange at one end and with a series of internal ridges intermediate its ends, the sleeve being compressed radially inwardly on to the hose by means of a second sleeve forced longitudinally over it to cause the internal ridges to grip the hose and the end flange to enter the groove on the main part of the end fitting. The split sleeve may be formed in at least two separate parts, and the second sleeve may be tapered internally at one end to enable it to be readily passd over the split sleeve.

The invention is hereinafter described with reference to the accompanying drawing, in which.

Figure 1:
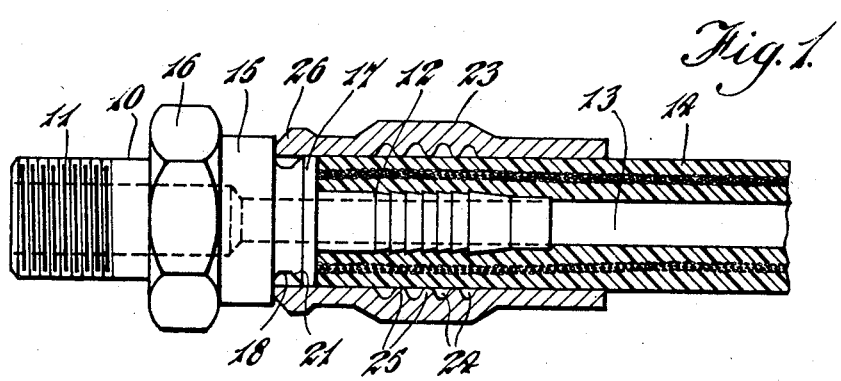
Figure 1 is a sectional view of one form of hose end fitting according to the invention with the parts assembled but before the sleeve has been compressed inwardly.
Figure 2:
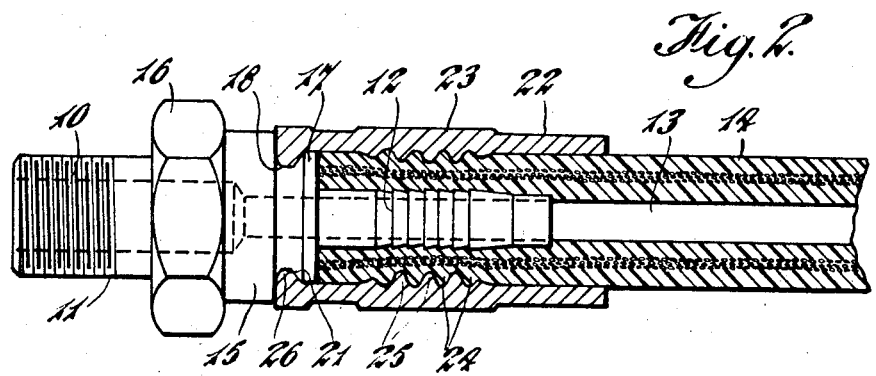
Figure 2 is a corresponding view showing the sleeve compressed.

In the form of the invention shown in Figures 1 and 2 the main part of the end fitting comprises the projecting portion 10 which is externally threaded at 11 for the attachment of the hose to a pipe union or the like, and the nipple 12, which enters the bore 13 of the hose 14, the projecting portion and nipple being connected by an enlarged portion 15 formed for part of its length with a hexagonal outer surface 16 to receive a spanner for holding the fitting during manipulation of the hose. Adjacent the nipple, the enlarged portion of the end fitting is slightly reduced in diameter at 17, and at the junction of the two diameters a circumferential groove 18 is formed. The groove is bounded on the side nearer the nipple by an inclined wall 21, so that it is of trapezoidal shape in cross section.

The outer sleeve 22 is substantially cylindrical, and has an externally thickened portion 23 intermediate its ends, the inner surface of the sleeve at this thickened portion being conveniently formed with a plurality of circumferential grooves 24 separated by ridges 25. A second externally thickened portion 26 is formed at one end of the sleeve.

The end fitting is assembled on the hose by passing the hose end 14 through the sleeve 22, pushing the nipple 12 into the bore of the hose, and bringing the thickened end 26 of the sleeve 22 up against the shoulder on the main part of the end fitting formed by the reduction in diameter at 17. The reduced part 17 between the groove 18 and the nipple 12 is of a diameter substantially equal to that of the exterior of the hose 14, and the interior of the sleeve 22, and thus locates the latter.

The assembled fitting is then placed in a swaging die having a diameter slightly greater than that of the main part of the sleeve, and it is moved axially through the die by means of a suitable plunger engaging its outer end. The die compressed the two thickened portions of the sleeve inwardly, the ridges 25 inside the intermediate thickened portion being forced into the material of the hose to grip it firmly between the sleeve and the nipple, whilst the end thickened portion 26 is forced into the groove 18 on the main part of the end fitting, thus securing the sleeve 22 firmly to the latter. The external surface of the nipple 12 is preferably formed with circumferential ridges as shown on the drawing, to provide a good grip on the hose.

Figure 3:
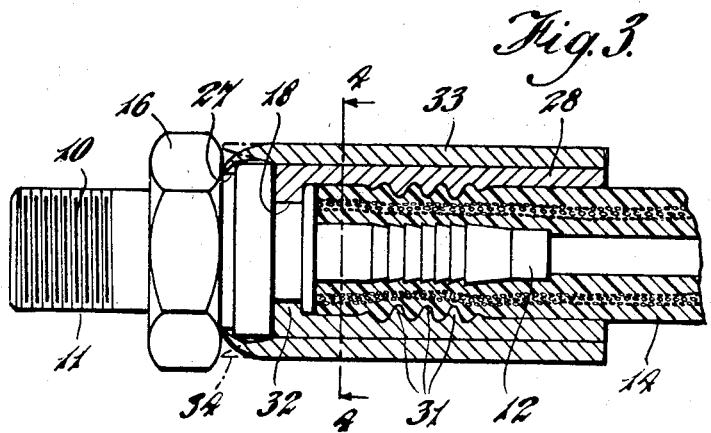
Figure 3 is a sectional view of another form of hose end fitting according to the invention in a completed state.
Figure 4:
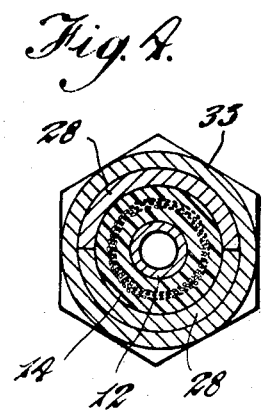
Figure 4 is a section on the line 4—4 of Figure 3.

In another form of the invention illustrated in Figures 3 and 4 the main part of the end fitting resembles that above described, but is provided with a second groove 27 between the groove 18 adjacent the nipple end, and the hexagonal portion 16. A sleeve 28, divided longitudinally into two parts is formed with internal ridges 31 intermediate its ends, and with an inwardly directed flange 32 at one end. A further sleeve 33 of plain cylindrical form with one end tapered internally as at 34 is adapted to be drawn over the segmental sleeve by a convenient drawing tool to compress the segmental sleeve 28 radially inwardly. The internal ridges of the segmental sleeve are forced into the material of the hose to grip the latter between the sleeve and the nipple, and the inwardly directed flange 32 of the sleeve 28 is forced into the groove 18 on the end fitting thus securing the sleeve 28 against longitudinal movement relative to the nipple. The end 34 of the outer sleeve is then peened over into the groove 27 on the main part of the end fitting to lock it in position. The split sleeve 28 may be in one piece with a single longitudinal split along its length, or may be in more than two pieces, and may be initially formed with a greater radius of curvature than it has when finally clamped in position, to reduce the likelihood of pinching the hose material between the parts as they are drawn together. The end of the sleeve 33 is shown in full lines in Figure 3 with its end peened over into the groove 27, and in chain dotted lines in its initial form.

In this second arrangement, the surrounding member by which the sleeve is compressed to grip the hose and secure the sleeve in position remains on the fitting to retain the parts in position and becomes an integral part thereof, instead of, as in the previous example, being a die through which the fitting is passed to permanently change the form of the sleeve. The second arrangement is consequently capable of being dismantled by the process of removing the peened-over end of the outer sleeve 33 and removing that sleeve. The remainder of the parts can be used again, with a new outer sleeve 33.

As the nipple is formed integral with the main body of the fitting, liquid is unable to find its way between these two parts and come into contact with the end of the hose. It has been found that if liquid does reach the end of the hose it saturates the cotton or other threads forming the reinforcement of the hose and tends to weaken them, and it is, therefore, a considerable advantage to ensure that no liquid can reach the exposed threads at the ends of the hose. Moreover, if the liquid flowing through the hose is at a high pressure, and can reach the end of the hose, it will tend to force the hose out of the end fitting, thus increasing the risk of failure of the hose.

The nipple may be separate from the main body of the end fitting, being for instance formed by a tube having an end flange, the tube being passed through the main body of the fitting from the outer end and its flange resting on a shoulder in the bore of the main body. The joint between the nipple and the main body of the hose end fitting may be rendered fluid-tight by soldering or brazing the nipple in place. For instance, the end face of the main body from which the nipple projects may be slightly countersunk around the aperture, the countersunk recess being filled with solder or spelter when the nipple is in place. The outer end of the main body may be internally threaded or externally threaded as required, or may take any other form convenient for the attachment of the hose to another component.

What I claim is:

A two-piece hose end fitting comprising a body portion having a nipple projecting axially therefrom, and integral therewith, and a circumferential groove adjacent the nipple, and a circumferentially continuous outer sleeve formed initially with external thickened portions extending circumferentially around it, one of said thickened portions registering, when the sleeve is assembled on the body portion, with a part of the nipple intermediate its ends, and another of the thickened portions registering with the groove in the body portion, said end fitting being secured to a hose by passing the assembled fitting axially through a swaging die to compress the thickened portions inwardly, one to grip the hose between itself and the nipple, and the other to enter the circumferential groove in the body portion and secure the sleeve thereto.

CYRIL DANIEL WATSON.